H. C. Smith.
Mower.
Nº 20225.          Patented May 11, 1858.
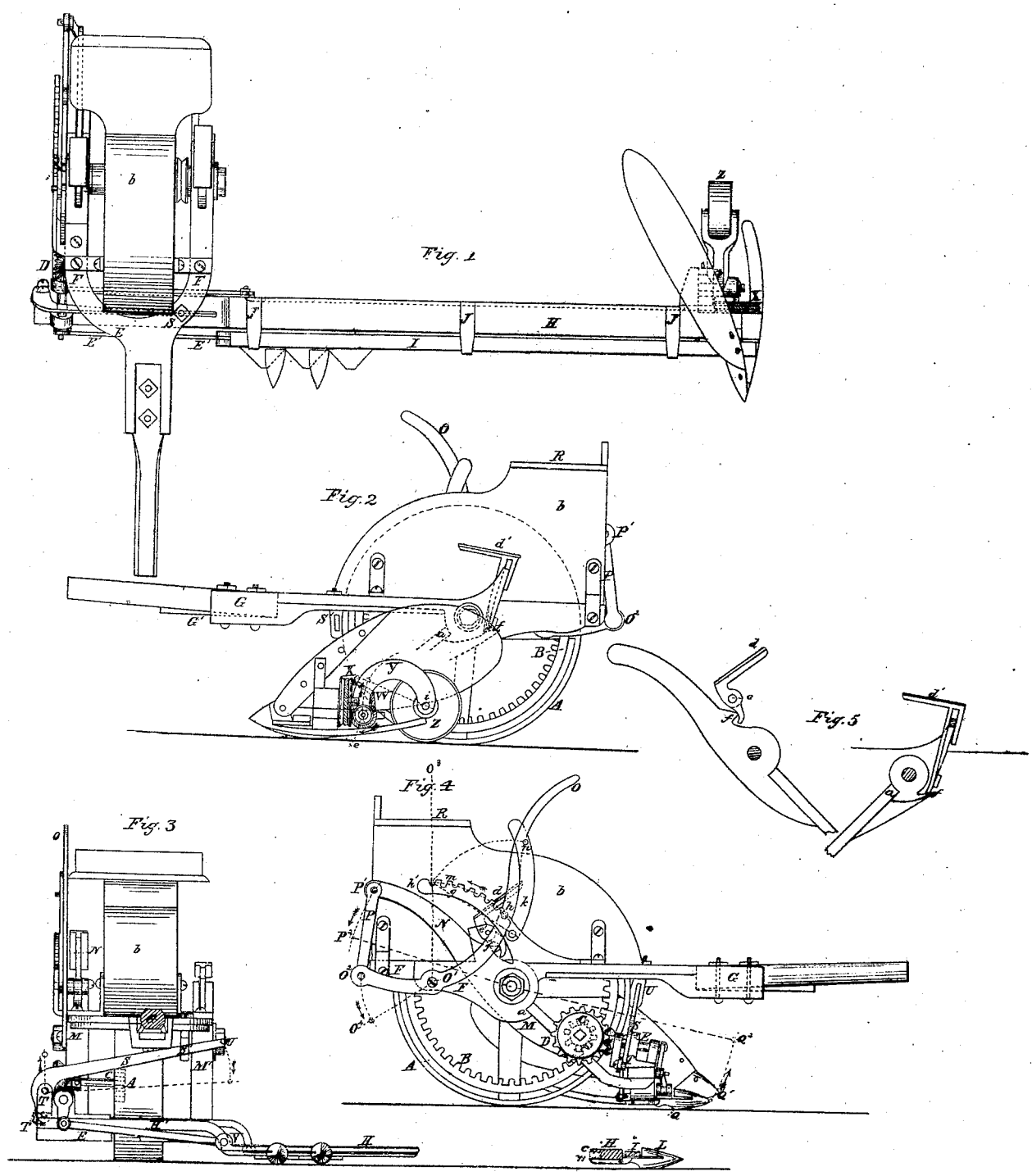

UNITED STATES PATENT OFFICE.

H. C. SMITH, OF CLEVELAND, OHIO.

IMPROVEMENT IN HARVESTERS.

Specification forming part of Letters Patent No. 20,225, dated May 11, 1858.

*To all whom it may concern:*

Be it known that I, HENRY C. SMITH, of Cleveland, Ohio, have invented new and useful Improvements in Harvesters, being an improvement on a harvester for which a patent was granted to me March 9, 1858; and I do hereby declare the following to be a full and complete description thereof, reference being had to the accompanying drawings, in which—

Figure 1 is a top view of the harvester; Fig. 2, an elevation upon the cutter-bar side; Fig. 3, a front view, and Fig. 4 an elevation of the side opposite that seen in Fig. 2. Fig. 5 shows a section.

Like letters refer to like parts in the different views.

My improvement relates to the application of an intermediate wheel at the end of the finger-bar when used in connection with a curved lever and flexible rod; also, to the employment of stops connected to the frame and placed in such position to the line of draft as will tend to counteract the dragging of the guards or finger-bar upon the ground when hinged to the axle of the driving-wheel by arms; also, the employment of steps, in connection with spurs attached to the arms before mentioned, for the purpose of raising the cutter-bar in connection with the hereinafter-described system of leverage; also, to the employment of a rabbet or groove in the heel of the cutter-bar for the purpose of preventing the flexible rod from being interfered with by cut grass or other obstructions. In my improvement I use but one driving-wheel. This is seen at A in the several figures, except in Fig. 1, in which figure the wheel is hidden from view by the cover and seat hereinafter to be described. The main wheel is furnished with an inside cog-gear, B, Figs. 2 and 4, which is seen upon the right side of the wheel in looking at the machine from the rear. This main cog-wheel gives motion to the pinion C, whose position is indicated by the dotted lines in Fig. 4.

D, Figs. 1 and 4, represents the bevel-gear upon the shaft of the pinion C. The bevel-wheel D drives the crank-shaft E. By thus placing the gear-wheels upon the extreme right of the machine I can get a much longer connecting-rod, E', than I otherwise could. By this means the machine can be worked with less power.

The frame of the machine consists of the hounds F F, which are attached to the axle of the driving-wheel. The neap is attached as seen at G. For the purpose of giving the neap a greater or less elevation in relation to other parts of the machine I introduce a wedge, G', Fig. 2, by the adjustment of which the neap can be elevated or depressed at pleasure.

The cutter-bar H is constructed in the usual form, the knife-bar I being secured by the pieces J. A section of the cutter-bar and knife-bar is seen at H, Fig. 3, with a finger or guard, L, attached. Upon the under side of the cutter-bar a rabbet is formed, which, in connection with the shank of the fingers, forms a groove, C, Fig. 3, in the back edge of the cutter-bar. The uses of this groove will be hereinafter explained. The cutter-bar is attached to arms M M, that articulate upon the axle of the driving-wheel shaft. These arms are placed in front of the driving-wheel, as seen in Figs. 3 and 4. The lower ends of these arms are secured by bolts to the right-hand end of the cutter-bar. That part of the cutter-bar, therefore, to which the arms are attached is very nearly vertical to the front part of the driving-wheel, and, being thus attached, it forms an inflexible cutter-bar. At the point where the arm M' is attached the cutter-bar is curved downward some four or five inches. This brings the cutters lower than that part of the cutter-bar that is situated in front of the wheel, and this difference in elevation brings this part H' above the stubble.

From the point where the arm M is attached to the axle another arm extends upward and backward, as seen at N, Figs. 3 and 4. The object of this is to furnish a lever by which the cutter-bar can be raised for the purpose of passing obstructions. The lever N is operated by means of another lever, O, the fulcrum of which is upon the frame F at O'. The short arm of the lever O is attached to the connecting-rod P, which connects it with the lever N at P'. The arms M M' are prevented from dropping below a certain point by stops *a a* upon both sides of the frame F, (seen at *a*, Figs. 2 and 4,) thus keeping the cutter-bar from pressing upon the ground. When the arms M M' rest upon the stops *a* the fingers of the cutter-bar lie nearly horizontal, as seen at Q, Fig. 4. The draft of the team tends to press the guards and cutter-bar on the ground, which would cause the machine to work heavily by an undue amount of side draft by the guards pressing on the ground, which would also cause the machine to be of heavy draft by the dragging; but by the introduction of the stops *a a* these difficulties are avoided. The point of draft being above the stops, the tendency of the guards and cutter-bar to drag or press upon the ground, as would be the case without the stops, is counteracted. The stops and wheel Z will hold the cutter-bar in a horizontal position without undue pressure on the ground.

The stops *a a* may be placed above the line of draft, if desirable.

The shaft of the wheel C being attached to the arm M, which has its point of attachment in the axle of the main wheel, the arms M M' may be raised or depressed without deranging the position of the gearing, and consequently the cutter-bar can be elevated without stopping the motion of the cutters or at all interfering with their action. The right-hand end of the cutter-bar is raised by the direct action of the lever O upon the lever N and arms M M', the lever N being an extension of the arm M, the axle of the wheel being the fulcrum upon which it acts. If the lever O is drawn back toward the driver's seat R to the red line $O^3$, the several parts connected therewith will be changed to the points indicated by the red lines, as seen at $P'$ $P^2$, $O^2$ $O^4$, and $Q'$ $Q^2$. Consequently the point of the fingers of the cutter-bar will be raised from $Q'$ to $Q^2$, and this, too, without changing the relative position of any of the running-gears; but this movement only provides for the elevation of the right-hand end of the cutter-bar, and for the purpose of giving the left-hand end a simultaneous movement I introduce the bent lever S, Figs. 3 and 4, which has its fulcrum in the stud T, Figs. 3 and 4. The long arm of this lever inclines upward a little, as seen in Fig. 3, the extremity being supported by a stirrup, U, Figs. 3 and 4, which is attached to the under side of the frame F at the left-hand side, nearly opposite the front of the wheel, as seen at S', Figs. 1, 2, and 3. Consequently when the right-hand end of the cutter-bar is elevated by drawing back the lever O to $O^3$, Fig. 4, the S' end of this lever will be relatively depressed, and the short arm will be carried outward, as indicated at T', Fig. 3. This movement draws upon the rod V, Fig. 3, to the end of which is attached a rod or chain, W, Fig. 2, a section of which is seen at W', Fig. 3. This chain passes over a wheel, X, Figs. 1 and 2, which wheel is attached to the left-hand end of the cutter-bar, and forms a fulcrum for the chain as it passes to and takes hold of the lever Y, Fig. 2. This wheel X, in combination with the rod and chain W W', forms a leverage by means of which the curved lever Y and wheel Z support the cutter-bar in a higher position. This curved lever Y is attached to the cutter-bar at *e* by a pin-joint. The free end *i* supports the wheel Z, which rests upon the ground, and carries the weight of the left-hand end of the cutter-bar. When the cutter-bar is down or close to the ground, as seen in Fig. 4 at Q, this wheel Z occupies the position seen in Fig. 2; but by drawing back the lever O to $O^2$, Fig. 4, the long arm of the lever S is relatively depressed by the rising of the right-hand end of the cutter-bar. This throws the short arm of the lever S outward, and draws upon the rod V and chain and rod W W', and brings the wheel Z very nearly under the point of attachment of the lever Y. This movement elevates the left-hand end of the cutter-bar the same distance the other end is raised. By the combined action of the lever O and its connections, and the changing of the position of the lever S, by raising the cutter-bar at the right-hand end, the left-hand end is simultaneously raised also by the wheel Z being drawn forward and under by the action of the intermediate wheel, X. That part of the driving-wheel above the frame is inclosed in a case or box, *b*, which forms the driver's seat, as seen at R. The driver, being thus placed back of the axle of the driving-wheel, partly compensates by his weight that of the cutter-bar, and to enable him more easily to draw back the lever O I provide movable steps on each side of the case *b*, upon which he can place his feet, and thus expend his strength as well as his weight in raising the cutter-bar, for these steps *d d'* rest upon a spur, *f*, extending backward from the articulating point of the arms M M', the two differing somewhat in form and mode of action, his strength operating upon the right side while his weight operates upon the left, the step *d* working on a pin-joint at *e'*.

In moving the harvester from place to place, or in cutting grain at any desired height, it is necessary to maintain a uniformity of distance between the ground and the cutter-bar. This I accomplish by means of the rack *g*, Fig. 4, having notches in the upper side, as seen at *h h'*, Fig. 4. These notches are concentric with the fulcrum O' of the lever O. A pin seen at *h* is inserted into the lever O for the purpose of keeping the lever O at any desired position while the machine is at work in cutting grain. In mowing, however, the cutter is intended to pass close to the ground and to be raised only to pass obstructions, and in thus temporarily drawing back the lever O for this purpose it is necessary to prevent the pin *h* from catching in the notches between *h* and *h'*. For this purpose I attach a thin plate of metal, *k*, to the rack *g*, just below *h*, this plate turning upon a pin, so that the pin *n* will rest in the notch *m* and prevent the pin seen at *h* from sliding into the notches in the rack. In going to or from a field the lever O can be drawn back to the last notch in the rack and the plate *k* pressed down upon the inside of the lever, thus holding the lever O secure in the last notch of the rack.

Some of the advantages of this improvement over those of the harvester for which a patent was issued to me of the date of March 9, 1858, are as follows: By placing the cutter-bar in front of the driving-wheel, in raising the cutter-bar the points of the fingers are elevated more than the heel of the cutter-bar. By the introduction of the intermediate wheel, X, the left-hand end of the cutter-bar is more certainly raised and more securely held in place. By this arrangement the same leverage is constantly kept upon the lever Y, whereas in my patent of March 9 the leverage is not constantly preserved. In that case, too, the cord or chain had to pass a short angle near the end of the cutter, by which the leverage is not obtained, as in the case with the wheel X. The cord or chain in passing this short angle would cut and wear by the strain and friction at this short angle, and it requires more power in this way to raise the end of the cutter than by the use of the wheel X, which gives an increased leverage over the patent of March 9, 1858, with less friction, and more firmly holds the end of the cutter-bar in place when raised. By placing the gears upon the extreme right of the frame I get a longer connecting-rod. By placing the cutter-bar forward and the driver's seat back of the axle of the driving-wheel the weight of the driver balances the frame of the machine. By placing the driver's seat back of the axle the driver can more conveniently perceive and control the operation of the machine, and more easily elevate the cutter-bar by transferring his weight to the steps.

What I claim as my improvement, and desire to secure by Letters Patent, is—

1. The application of the intermediate wheel, X, at the end of the finger-bar, when used in combination with the curved lever Y and flexible rod W, arranged and operating substantially as specified.

2. The stops $a\,a$, connected to the frame and placed in such position to the line of draft as will tend to counteract the dragging of the guards or finger-bar upon the ground when hinged to the axle of the driving-wheel by the arms M M', substantially in the manner and for the purpose described.

3. The steps $d\,d'$, in combination with the spurs $f\,f$, attached to the arms M M', for the purpose of raising the cutter-bar, in connection with the described system of leverage, as set forth.

4. The rabbet or groove $c$, formed in the heel of the cutter-bar, in the manner and for the purpose before described.

H. C. SMITH.

Witnesses:
    J. BRAINERD,
    W. H. BURRIDGE.